United States Patent
Yamauchi

(10) Patent No.: US 9,642,085 B2
(45) Date of Patent: May 2, 2017

(54) RADIO COMMUNICATION SYSTEM, TRANSMISSION-SOURCE RADIO COMMUNICATION APPARATUS, DESTINATION RADIO COMMUNICATION APPARATUS, AND RADIO COMMUNICATION METHOD

(75) Inventor: Takahisa Yamauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 14/379,388

(22) PCT Filed: Jul. 31, 2012

(86) PCT No.: PCT/JP2012/069459
§ 371 (c)(1),
(2), (4) Date: Aug. 18, 2014

(87) PCT Pub. No.: WO2013/125070
PCT Pub. Date: Aug. 29, 2013

(65) Prior Publication Data
US 2015/0055530 A1    Feb. 26, 2015

(30) Foreign Application Priority Data
Feb. 24, 2012    (JP) ................. 2012-038855

(51) Int. Cl.
*H04W 52/02*    (2009.01)
*H04W 84/18*    (2009.01)

(52) U.S. Cl.
CPC ........ *H04W 52/0216* (2013.01); *H04W 84/18* (2013.01)

(58) Field of Classification Search
None
See application file for complete search history.

(56) References Cited

U.S. PATENT DOCUMENTS

2008/0181127 A1    7/2008   Terry et al.
2009/0201906 A1*   8/2009   Fukui ............... H04M 1/67
                                                    370/345
(Continued)

FOREIGN PATENT DOCUMENTS

JP    2007-208586 A    8/2007
JP    2010-517481 A    5/2010
(Continued)

OTHER PUBLICATIONS

International Search Report issued on Sep. 4, 2012, in PCT/JP2012/069459 with English translation.
(Continued)

*Primary Examiner* — Ayaz Sheikh
*Assistant Examiner* — Peter Chau
(74) *Attorney, Agent, or Firm* — Oblon, McClelland, Maier & Neustadt, L.L.P.

(57) ABSTRACT

A transmission-source radio communication apparatus includes a transmission-time-sum integrating unit integrating transmission time per unit time of a radio frame, a transmission-time estimating and integrating unit estimating and integrating the transmission time per unit time in the future of a radio device number frame, a transmission-limit-time-of-day estimating unit estimating, using two integration results, a sum-limit-exceeding estimated time of day and a less-than-sum-limit estimated time of day, and a transmission control unit notifying a destination radio communication apparatus of the two estimated times of day. The destination radio communication apparatus includes a reception control unit determining, using the two estimated times of day, whether reception of a radio frame from the transmission-source radio communication apparatus is stopped and a transmission control unit determining, using the two estimated times of day, whether transmission of a radio
(Continued)

frame to the transmission-source radio communication apparatus is stopped.

9 Claims, 7 Drawing Sheets

(56) References Cited

U.S. PATENT DOCUMENTS

| | | |
|---|---|---|
| 2010/0177720 A1 | 7/2010 | Sugaya |
| 2011/0128895 A1* | 6/2011 | Sadek .................. H04W 16/14 370/280 |
| 2012/0263088 A1 | 10/2012 | Terry et al. |

FOREIGN PATENT DOCUMENTS

| | | |
|---|---|---|
| JP | 2010-161741 A | 7/2010 |
| JP | 2010-166151 A | 7/2010 |
| JP | 2010-193290 A | 9/2010 |
| JP | 2012-65077 A | 3/2012 |

OTHER PUBLICATIONS

Takaaki Hatauchi, et al., "A Power Efficient Access Method by Polling for Wireless Mesh Networks", IEEJ Trans. on Electronics, Information and Systems, vol. 128, No. 12, 2008, pp. 1761-1766 (with partial English translation).

"950MHz-Band Telemeter, Telecontrol and Data Transmission Radio Equipment for Specified Low Power Radio Station", Association of Radio Industries and Businesses, ARIB STD-T961. 1edition, Jul. 15, 2010, 34 pages (with partial English translation).

Korean Office Action issued Nov. 6, 2015 in Patent Application No. 10-2014-7026368 (with English translation).

\* cited by examiner

RADIO FRAME TYPE: RADIO DEVICE NUMBER (ID)
DATA TRANSMISSION REQUEST (SREQ)
TRANSMISSION REQUEST ACKNOWLEDGE (RACK)
DATA (DATA)
DATA ACKNOWLEDGE (DACK)

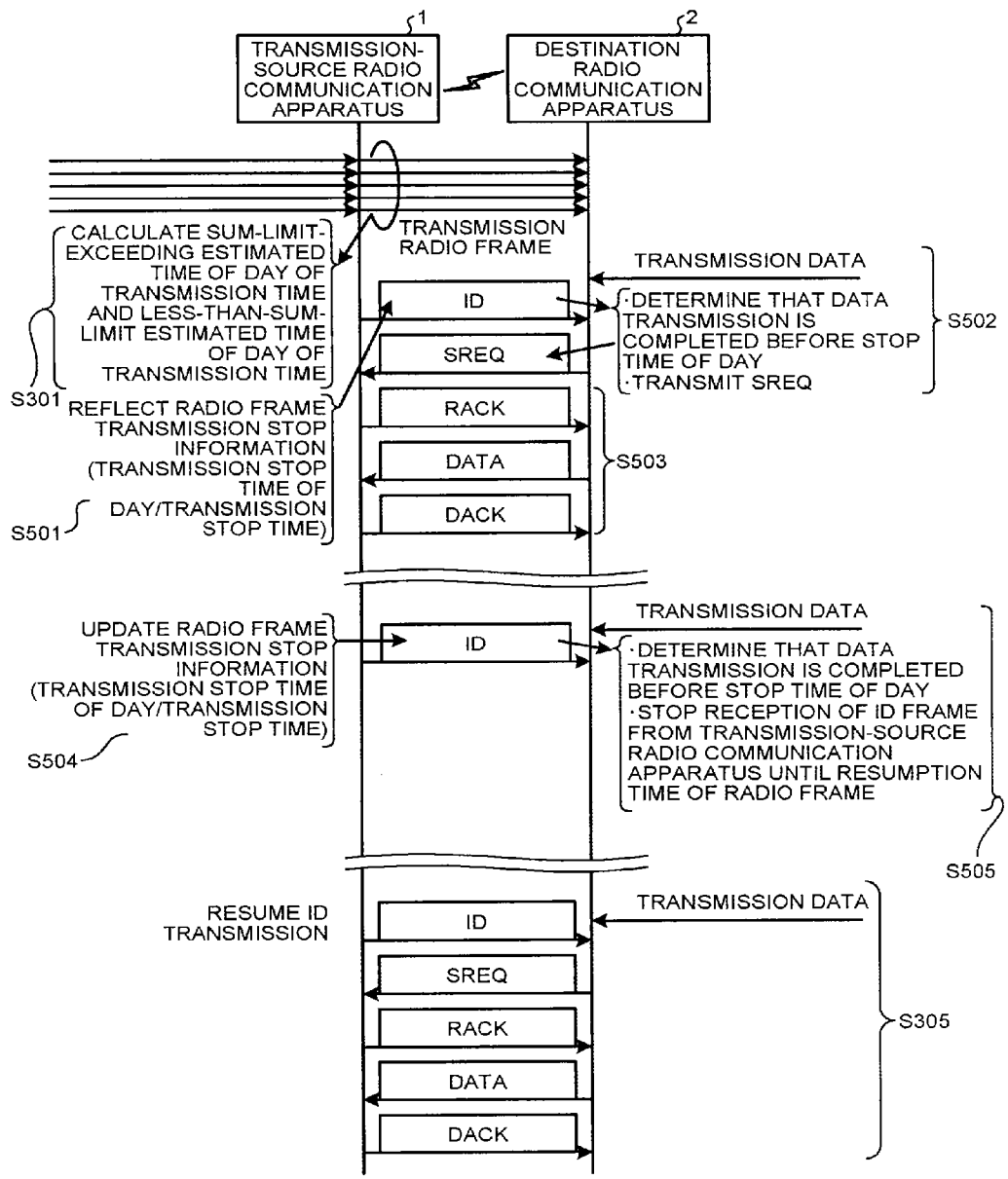

RADIO COMMUNICATION SYSTEM, TRANSMISSION-SOURCE RADIO COMMUNICATION APPARATUS, DESTINATION RADIO COMMUNICATION APPARATUS, AND RADIO COMMUNICATION METHOD

FIELD

The present invention relates to a radio communication system that intermittently performs transmission and reception of a radio frame.

BACKGROUND

Conventionally, in a radio communication system, such as WiMedia UWB (Ultra Wide Band) based on ECMA368/369 or ZigBee (registered trademark) based on IEEE802.15.4, in order to reduce power consumption of a radio communication apparatus, an intermittent operation for intermittently transmitting or receiving a radio frame is performed. In these radio communication systems, a beacon period is determined at predetermined super frame periods. Radio communication apparatuses exchange beacon signals within the beacon period, check a mutual connection relation among the radio communication apparatuses, and intermittently repeat transmission or reception of radio frames on the basis of a certain period.

However, in the conventional radio communication system, it is difficult to define the intermittent operation for a long time and there is a limit in power consumption. The radio communication apparatuses exchange information concerning the intermittent operation on the basis of the beacon signal for checking the connection relation. The radio communication apparatuses need to perform operations synchronized with the beacon signal transmitted at predetermined periods. Therefore, when a large number of radio communication apparatuses are present in the radio communication system, it is difficult to synchronize between the radio communication apparatuses.

Therefore, as a method of causing the radio communication apparatuses to perform the intermittent operation for a long time, for example, Patent Literature 1 described below discloses a connection management method for forming a connection relation among radio communication apparatuses through exchange of beacon signals and a method in which a communication apparatus exchanges information concerning a predetermined quiescent period with a radio communication apparatus with which the communication apparatus has a connection relation and suspends an operation of the communication apparatus itself until a predetermined quiescent time elapses from a predetermined time of day.

As a method of attaining synchronization among radio communication apparatuses, Non Patent Literature 1 described below discloses a method in which radio communication apparatuses periodically and intermittently transmit IDs of the radio communication apparatuses and perform an operation for staying on standby for reception of a radio frame for a fixed time immediately after transmitting the IDs and a method in which a radio communication apparatus staying on standby for transmission of a radio frame waits for reception of an ID from a destination radio communication apparatus and, when the radio communication apparatus transmits a radio frame immediately after receiving the ID, the destination radio communication apparatus can receive the radio frame during reception standby immediately after the ID.

In Non Patent Literature 2 described below, as an example of provision of a limit for the sum of transmission times, the sum of transmission times per hour being equal to or smaller than 360 seconds is provided as a limit.

CITATION LIST

Patent Literature

Patent Literature 1: Japanese Patent Application Laid-Open No. 2010-161741

Non Patent Literature

Non Patent Literature 1: T. Hatauchi, Y. Fukuyama, M. Ishii, and T. Shikura: "A Power Efficient Access Method by Polling for Wireless Mesh Networks," IEEJ Trans. On Electronics, Information and Systems, vol. 128, no. 12, pp. 1761.1766 (2008)

Non Patent Literature 2: Association of Radio Industries and Businesses "Radio Equipment for Specified Small Electric Power Radio Station 950 MHz Band Telemeter, for telecontrol, and for data transmission" ARIB STD-T96 1.1 edition, Jul. 15, 2010

SUMMARY

Technical Problem

However, according to the conventional technologies, it is not taken into account that, because the limit is provided for the sum of the transmission times of the radio frame per unit time, a beacon or an ID cannot be temporarily transmitted. Therefore, there is a problem in that a radio communication apparatus that cannot transmit a beacon or an ID and a radio communication apparatus staying on standby for transmission or reception of a radio frame have to continue a standby state for transmission or reception of the radio frame until the radio communication apparatus that cannot transmit the beacon or the ID transmits the beacon or the ID again and wastefully consume electric power.

The present invention has been devised in view of the above and it is an object of the present invention to obtain a radio communication system that can stop, when a communication-partner radio communication apparatus cannot transmit an ID, a standby state in a radio communication apparatus staying on standby for transmission or reception of a radio frame.

Solution to Problem

In order to solve the above problems and achieve the object, the present invention is a radio communication system that includes a transmission-source radio communication apparatus that transmits data and a destination radio communication apparatus that receives the data, wherein the transmission-source radio communication apparatus includes: a transmission-time-sum integrating unit that integrates a transmission time per unit time of a radio frame transmitted from the own apparatus; a transmission-time estimating and integrating unit that estimates and integrates the transmission time per unit time in a future of a radio device number frame for periodically and intermittently reporting a radio device number of the own apparatus; a transmission-limit-time-of-day estimating unit that estimates, using an integration result of the transmission-time-sum integrating unit and an integration result of the transmission-time estimating and integrating unit, a sum-limit-exceeding estimated time of day, at which a transmission time of a radio frame from the own apparatus exceeds a specified sum limit time of the transmission time per unit time, and a less-than-sum-limit estimated time of day, at which a transmission time of a radio frame becomes less than the sum limit time after the sum-limit-exceeding estimated time of day, or at least one of the sum-limit-exceeding estimated time of day and the less-than-sum-limit estimated time of day; and a transmission-source transmission control unit that notifies the destination radio communication apparatus of the sum-limit-exceeding estimated time of day and the less-than-sum-limit estimated time of day or at least one of the sum-limit-exceeding estimated time of day and the less-than-sum-limit estimated time of day in a state included in a radio frame before the sum-limit-exceeding estimated time of day, and the destination radio communication apparatus includes: a reception control unit that determines, using the sum-limit-exceeding estimated time of day and the less-than-sum-limit estimated time of day or at least one of the sum-limit-exceeding estimated time of day and the less-than-sum-limit estimated time of day, whether reception of a radio frame from the transmission-source radio communication apparatus is stopped; and a destination transmission control unit that determines, using the sum-limit-exceeding estimated time of day and the less-than-sum-limit estimated time of day or at least one of the sum-limit-exceeding estimated time of day and the less-than-sum-limit estimated time of day, whether transmission of a radio frame to the transmission-source radio communication apparatus is stopped.

Advantageous Effects of Invention

The radio communication apparatus according to the present invention has an effect that it is possible to stop, when a communication-partner radio communication apparatus cannot transmit an ID, a standby state in a radio communication apparatus staying on standby for transmission or reception of a radio frame.

BRIEF DESCRIPTION OF DRAWINGS

FIG. 8 is a sequence diagram illustrating a state in which a radio frame is intermittently transmitted and received in a radio communication system in a third embodiment.

DESCRIPTION OF EMBODIMENTS

Embodiments of a radio communication system according to the present invention are explained in detail below with reference to the drawings. Note that the present invention is not limited by the embodiments.

First Embodiment

Figure 1:
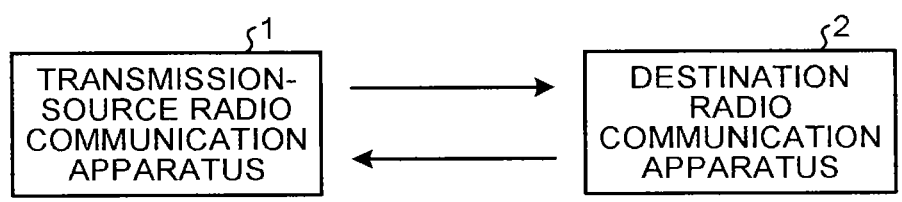
FIG. 1 is a diagram of a configuration example of a radio communication system in a first embodiment.

FIG. 1 is a diagram of a configuration example of a radio communication system in the present embodiment. The radio communication system is configured to include a transmission-source radio communication apparatus 1 that transmits data and a destination radio communication apparatus 2 that receives data from the transmission-source radio communication apparatus 1. Transmission and reception of a radio frame are performed between the transmission-source radio communication apparatus 1 and the destination radio communication apparatus 2. For convenience of explanation, the transmission side of data is set as the transmission-source radio communication apparatus 1 and the reception side of data is set as the destination radio communication apparatus 2. However, the transmission-source radio communication apparatus 1 and the destination radio communication apparatus 2 can be radio communication apparatuses having the same configuration. Therefore, it is also possible to transmit data from the destination radio communication apparatus 2 to the transmission-source radio communication apparatus 1. In the explanation, one transmission-source radio communication apparatus 1 and one destination radio communication apparatus 2 are provided. However, this is only an example. It is also possible to connect a plurality of the transmission-source radio communication apparatuses 1 and a plurality of the destination radio communication apparatuses 2.

Figure 2:
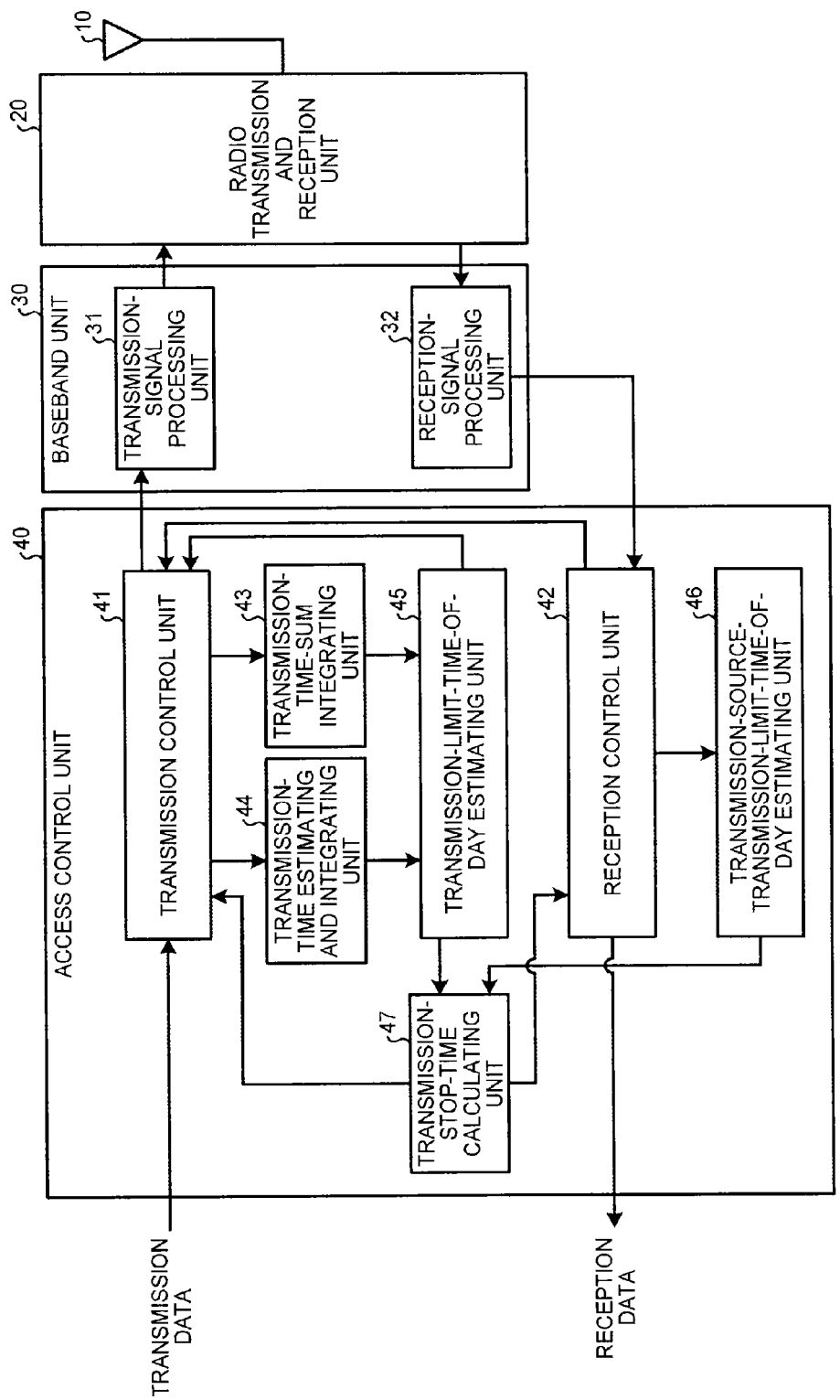
FIG. 2 is a diagram of a configuration example of a radio communication apparatus in the first embodiment.

The configuration of a radio communication apparatus is explained. FIG. 2 is a diagram of a configuration example of a radio communication apparatus in the present embodiment. The radio communication apparatus includes an antenna 10, a radio transmission and reception unit 20, a baseband unit 30, and an access control unit 40.

The antenna 10 outputs an RF signal received from another radio communication apparatus to the radio transmission and reception unit 20 and transmits an RF signal input from the radio transmission and reception unit 20 to another radio communication apparatus.

The radio transmission and reception unit 20 down-converts an RF reception signal input from the antenna 10 into an IF signal and outputs a baseband reception signal subjected to digital conversion to the baseband unit 30. The radio transmission and reception unit 20 subjects a baseband transmission signal input from the baseband unit 30 to analog conversion, up-converts the baseband transmission signal from an IF signal into an RF signal, and outputs the baseband transmission signal to the antenna 10 as an RF transmission signal.

The baseband unit 30 includes a transmission-signal processing unit 31 and a reception-signal processing unit 32. The baseband unit 30 performs digital radio signal processing. In the baseband unit 30, the reception-signal processing unit 32 subjects a baseband reception signal input from the radio transmission and reception unit 20 to digital signal processing to thereby perform demodulation processing and error correction decoding processing and outputs a reception radio frame (DATA) to the access control unit 40. In the baseband unit 30, the transmission-signal processing unit 31 applies error correction processing to a transmission radio frame (DATA) input from the access control unit 40 to perform modulation processing and outputs the transmission radio frame to the radio transmission and reception unit 20 as a baseband transmission signal.

The access control unit 40 includes a transmission control unit 41, a reception control unit 42, a transmission-time-sum integrating unit 43, a transmission-time estimating and integrating unit 44, a transmission-limit-time-of-day estimating unit 45, a transmission-source-transmission-limit-time-of-day estimating unit 46, and a transmission-stop-time calculating unit 47. The access control unit 40 processes transmission data received from a not-shown network unit or application unit and outputs the transmission data to the baseband unit 30. Therefore, the transmission control unit 41 gives header information and an error detection code to the transmission data and generates a transmission radio frame (DATA). The reception control unit 42 analyzes, from header information and an error correction code, a reception radio frame (DATA) received from the baseband unit 30, extracts reception data, and outputs the reception data to the not-shown network unit or application unit.

Specifically, as the operation of the access control unit 40, an operation performed when the own apparatus transmits a transmission radio frame is explained. The transmission control unit 41 determines, according to whether a data acknowledge frame (DACK) to a transmission radio frame (DATA) transmitted by the transmission control unit 41 can be received by the reception control unit 42 from the destination radio communication apparatus 2, whether an error occurs in a radio channel. The transmission control unit 41 performs retransmission control for performing retransmission processing for the transmission radio frame (DATA). The transmission control unit 41 generates a radio device number frame (ID) for informing a peripheral radio communication apparatus of a radio device number of the own apparatus and periodically and intermittently outputs the radio device number frame (ID) to the baseband unit 30.

Note that, when the transmission control unit 41 generates the transmission radio frame (DATA), the transmission control unit 41 does not immediately output the transmission radio frame (DATA) to the baseband unit 30. When the transmission control unit 41 generates the transmission radio frame (DATA), after being notified from the reception control unit 42 that an ID is received from the destination radio communication apparatus 2 in the own apparatus, the transmission control unit 41 generates a data transmission request frame (SREQ) addressed to the destination radio communication apparatus 2 and outputs the SREQ to the baseband unit 30. After output of the SREQ, when the transmission control unit 41 is notified from the reception control unit 42 that a transmission request acknowledge frame (RACK) is received from the destination radio communication apparatus 2 in the own apparatus, the transmission control unit 41 outputs the transmission radio frame (DATA) that is put on standby for transmission to the baseband unit 30.

Note that, when the own apparatus receives the DATA from the transmission-source radio communication apparatus 1, when the transmission control unit 41 is notified from the reception control unit 42 that the SREQ is received from the transmission-source radio communication apparatus 1 in the own apparatus, the transmission control unit 41 determines, on the basis of, for example, connection relation information on the own apparatus and the transmission-source radio communication apparatus 1 received from a not-shown network unit or the like, whether the RACK is transmitted to the transmission-source radio communication apparatus 1. When the own apparatus and the transmission-source radio communication apparatus 1 are in a connection relation, the transmission control unit 41 outputs the RACK to the baseband unit 30.

When the transmission control unit 41 is notified from the reception control unit 42 that the DATA transmitted from the transmission-source radio communication apparatus 1 is normally received, the transmission control unit 41 outputs the DACK addressed to the transmission-source radio communication apparatus 1 to the baseband unit 30.

The transmission control unit 41 outputs a transmission byte length to the transmission-time-sum integrating unit 43 every time the transmission control unit 41 transmits all transmission frames such as a transmission radio frame and a retransmission radio frame. The transmission control unit 41 outputs, to the transmission-time estimating and integrating unit 44, a transmission byte length and a transmission period of a radio device number frame (ID) that is periodically and intermittently transmitted.

The transmission-time-sum integrating unit 43 calculates a transmission time on a radio section of the transmission radio frame and the retransmission radio frame on the basis of a transmission byte length for each of radio frames from the transmission control unit 41, a physical header size length set in advance, transmission speed, and the like, integrates the sum of transmission times per unit time, which is always up to date and set in advance, and regularly outputs an integration result to the transmission-limit-time-of-day estimating unit 45.

The transmission-time estimating and integrating unit 44 estimates, on the basis of the transmission byte length of the ID and the transmission period from the transmission control unit 41, the physical header size set in advance, the transmission speed, and the like, a transmission time of an ID scheduled to be transmitted in the future. The transmission-time estimating and integrating unit 44 integrates the sum of transmission times in a radio section of the ID per unit time in the future and regularly outputs an integration result to the transmission-limit-time-of-day estimating unit 45. Note that, when it can be grasped in advance that the transmission byte length of the ID, the transmission period, the physical header size length, and the transmission speed are fixed, the transmission-time estimating and integrating unit 44 does not need to regularly output the integration result to the transmission-limit-time-of-day estimating unit 45 and only has to notify the transmission-limit-time-of-day estimating unit 45 of the integration result once immediately after the own apparatus is activated.

The transmission-limit-time-of-day estimating unit 45 compares, on the basis of the latest sum integration result of the transmission time per unit time from the transmission-time-sum integrating unit 43 and the sum integration result of the transmission time of the ID per unit time in the future from the transmission-time estimating and integrating unit 44, the transmission time in the transmission control unit 41 with a sum limit time of a transmission time per unit time set in advance. The transmission-limit-time-of-day estimating unit 45 calculates a sum-limit-exceeding estimated time of day of a transmission time, at which it is estimated that the transmission time in the transmission control unit 41 exceeds the sum limit time of the transmission time and a less-than-sum-limit estimated time of day of a transmission time, at which the excess of the sum limit time of the transmission time is eliminated, and outputs the sum-limit-exceeding estimated time of day of the transmission time and the less-than-sum-limit estimated time of day of the transmission time to the transmission-stop-time calculating unit 47.

The transmission-stop-time calculating unit 47 calculates, on the basis of the sum-limit-exceeding estimated time of day of the transmission time and the less-than-sum-limit estimated time of day of the transmission time, time during which transmission of a radio frame of the own apparatus is stopped (transmission stop time). The transmission stop time can be calculated according to a difference between the less-than-sum-limit estimated time of day of the transmission time and the sum-limit-exceeding estimated time of day of the transmission time. The transmission-stop-time calculating unit 47 notifies the transmission control unit 41 of a transmission stop time of day, at which transmission of the radio frame is stopped in the own apparatus (the sum-limit-exceeding estimated time of day of the transmission time) and the transmission stop time.

The transmission control unit 41 gives, on the basis of the transmission stop time of day and the transmission stop time of the radio frame from the transmission-stop-time calculating unit 47, the transmission stop time of day and the transmission stop time of the radio frame of the own apparatus to at least one frame among the ID, the SREQ, the RACK, the DATA, and the DACK to generate a transmission radio frame and outputs the transmission radio frame to the baseband unit 30.

As the operation of the access control unit 40, an operation performed when a reception radio frame is received from the transmission-source radio communication apparatus 1 is explained. The reception control unit 42 extracts the transmission stop time of day and the transmission stop time of the radio frame in the transmission-source radio communication apparatus 1 given to the reception radio frame of the ID, the SREQ, the RACK, the DATA, or the DACK and outputs the transmission stop time of day and the transmission stop time to the transmission-source-transmission-limit-time-of-day estimating unit 46.

The transmission-source-transmission-limit-time-of-day estimating unit 46 calculates a sum-limit-exceeding time of day of a transmission time and a less-than-sum-limit time of day of a transmission time of each transmission-source radio communication apparatus 1 on the basis of the transmission stop time of day and the transmission stop time of the radio frame of each transmission-source radio communication apparatus 1 from the reception control unit 42. The less-than-sum-limit time of day of the transmission time can be calculated as a time of day after elapse of the transmission stop time from the transmission stop time of day. The sum-limit-exceeding time of day of the transmission time is the indicated transmission stop time of day. The transmission-source-transmission-limit-time-of-day estimating unit 46 outputs the sum-limit-exceeding time of day of the transmission time and the less-than-sum-limit time of day of the transmission time to the transmission-stop-time calculating unit 47.

The transmission-stop-time calculating unit 47 calculates transmission stop time of each transmission-source radio communication apparatus 1 on the basis of the sum-limit-exceeding time of day of the transmission time and the less-than-sum-limit time of day of the transmission time of each transmission-source radio communication apparatus 1. The transmission-stop-time calculating unit 47 sets the sum-limit-exceeding time of day as a transmission stop time of day and notifies the transmission control unit 41 and the reception control unit 42 of the transmission stop time of day and the transmission stop time of the radio frame of each transmission-source radio communication apparatus 1.

The transmission control unit 41 determines, on the basis of the transmission stop time of day and the transmission stop time of the radio frame of each transmission-source radio communication apparatus 1 from the transmission-stop-time calculating unit 47, whether transmission of the radio frame to the transmission-source radio communication apparatus 1 is stopped.

The reception control unit 42 determines, on the basis of the transmission stop time of day and the transmission stop time of the radio frame of each transmission-source radio communication apparatus 1 from the transmission-stop-time calculating unit 47, whether reception of the radio frame in the transmission-source radio communication apparatus 1 is stopped.

Figure 3:
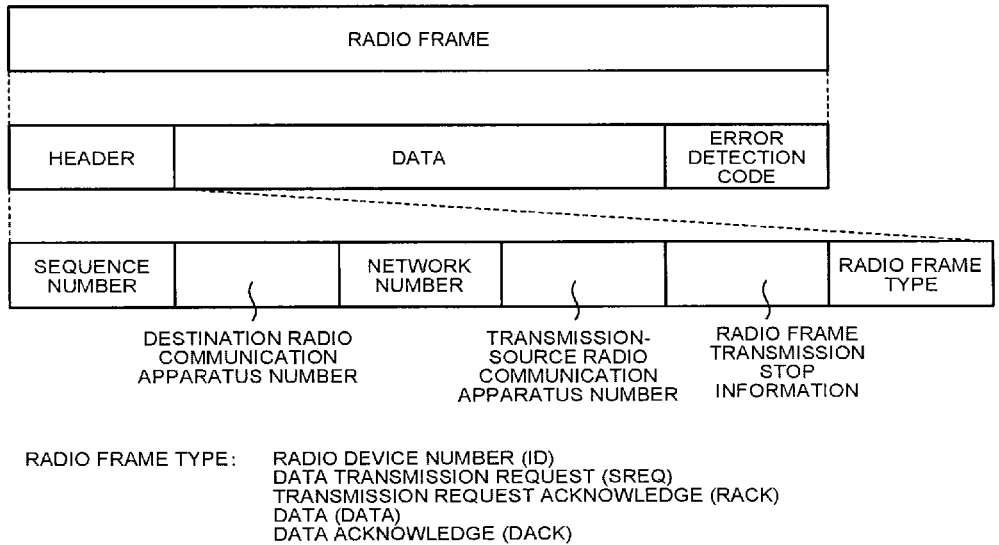
FIG. 3 is a diagram of a format of a radio frame used in the radio communication apparatus.

A radio frame used in the radio communication apparatus is explained. FIG. 3 is a diagram of a format of the radio frame used in the radio communication apparatus. The radio frame includes a header, data, and an error detection code. The header is common to respective radio frames and includes a sequence number, a destination radio communication apparatus number, a network number, a transmission-source radio communication apparatus number, radio frame transmission stop information, and a radio frame type. Identification of the radio frame is performed according to a radio frame type. The data is not used in the SREQ, the RACK, and the DACK. When the radio frame type is the ID, a radio device number is stored in the data. When the radio frame type is the DATA, transmission data or reception data is stored in the data. In the radio frame transmission stop information, the transmission stop time of day and the transmission stop time of the radio frame given by the transmission control unit 41 of the radio communication apparatus are stored.

Figure 4:
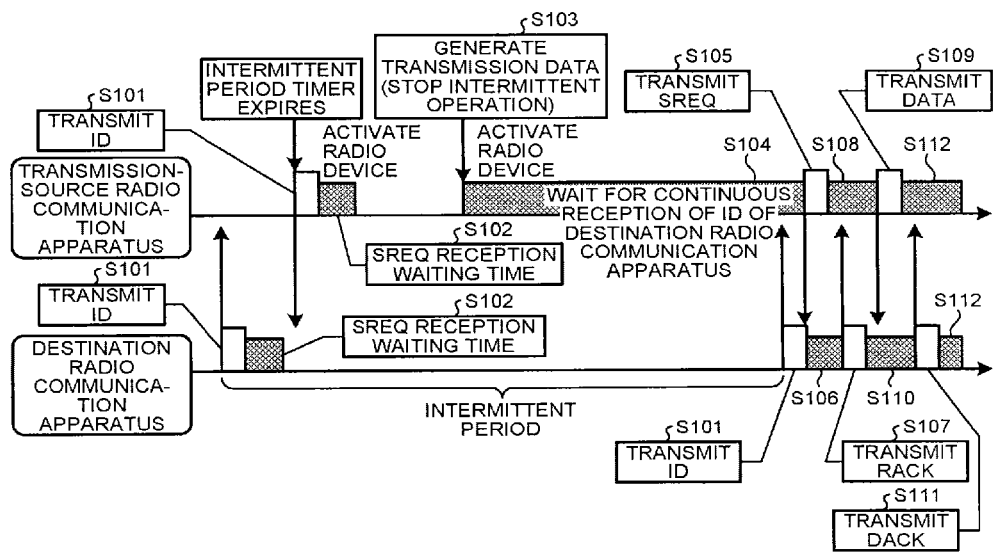
FIG. 4 is a timing chart illustrating a state of transmission and reception of a radio frame in a conventional radio communication system.

Transmission and reception of a radio frame in the conventional radio communication system are explained. FIG. 4 is a timing chart illustrating a state of the transmission and reception of the radio frame in the conventional radio communication system. An explanation will be made of a case where the DATA can be transmitted from the transmission-source radio communication apparatus to the destination radio communication apparatus.

First, the transmission-source radio communication apparatus and the destination radio communication apparatus repeat, for each intermittent period, a radio device activated state and a sleep state. When the intermittent period timer expires, the transmission-source radio communication apparatus and the destination radio communication apparatus activate a radio device and transmit the ID to inquire of the peripheral radio communication apparatus about the presence or absence of a frame addressed to the own apparatuses (step S101).

Immediately after transmitting the ID, the transmission-source radio communication apparatus and the destination radio communication apparatus change to a reception waiting state for a reception waiting period for receiving the SREQ addressed to the own apparatuses (step S102). When no frame is received from the peripheral radio communication apparatus, the transmission-source radio communication apparatus and the destination radio communication apparatus shift to the sleep state again.

The transmission-source radio communication apparatus in which transmission data is generated immediately stops an intermittent operation, that is, stops the sleep and activates the radio device and continues a radio device activated state until the ID transmitted from the destination radio communication apparatus is received (step S103).

When the intermittent period timer expires and the destination radio communication apparatus transmits the ID again (step S101), the transmission-source radio communication apparatus receives the ID from the destination radio communication apparatus (step S104) and transmits the SREQ to the destination radio communication apparatus (step S105).

When the destination radio communication apparatus receives the SREQ from the transmission-source radio communication apparatus 1 (step S106), the destination radio communication apparatus transmits the RACK to the transmission-source radio communication apparatus (step S107).

When the transmission-source radio communication apparatus receives the RACK from the destination radio communication apparatus (step S108), the transmission-source radio communication apparatus and the destination radio communication apparatus transition to a link establishment state. The transmission-source radio communication apparatus transmits the DATA to the destination radio communication apparatus (step S109).

When the destination radio communication apparatus normally receives the DATA from the transmission-source radio communication apparatus (step S110), the destination radio communication apparatus transmits the DACK to the transmission-source radio communication apparatus (step S111).

After the transmission-source radio communication apparatus transmits all the transmission data, the destination radio communication apparatus shifts to the intermittent operation again after the link continuation time timer expires (step S112).

Figure 5:
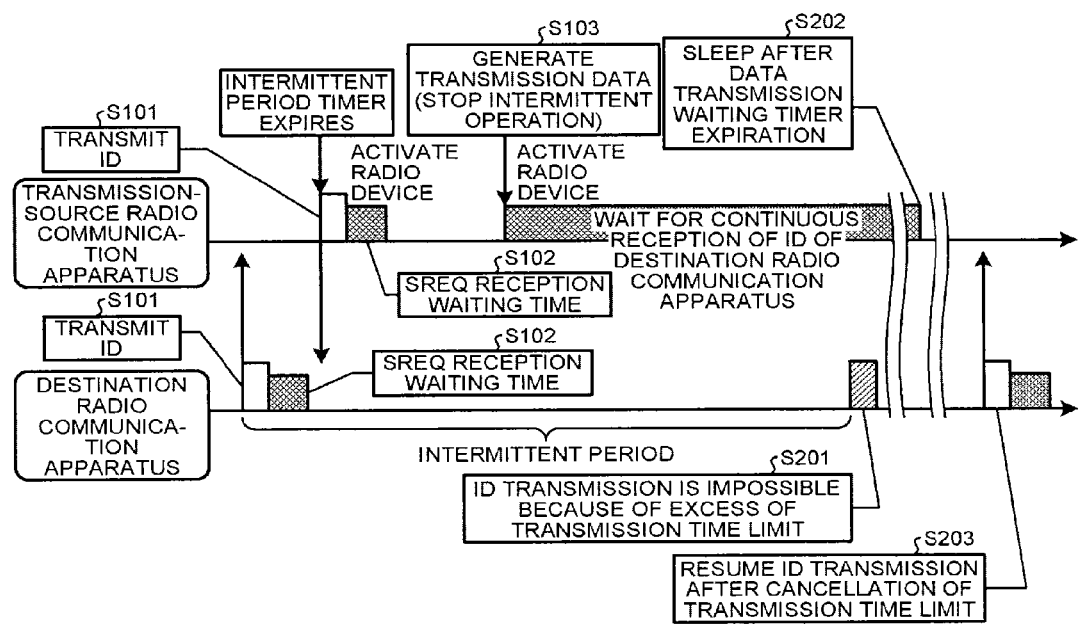
FIG. 5 is a timing chart illustrating a state of transmission and reception of a radio frame in the conventional radio communication system.

An explanation will be made of a case where the DATA could not be transmitted from the transmission-source radio communication apparatus to the destination radio communication apparatus in the conventional radio communication system. FIG. 5 is a timing chart illustrating a state of the transmission and reception of the radio frame in the conventional radio communication system. An explanation will be made of an operation in which the destination radio communication apparatus cannot transmit the ID because of a transmission time limit and the transmission-source radio communication apparatus cannot receive the ID from the destination radio communication apparatus and continues the radio device activated state. Note that steps S101 to S103 are the same as the steps shown in FIG. 4. Therefore, explanation of the steps is omitted.

The destination radio communication apparatus recognizes that the transmission time limit is exceeded at a point when the last ID is transmitted and cannot transmit the ID (step S201). Therefore, thereafter, the destination radio communication apparatus changes to the reception state or the sleep state.

The transmission-source radio communication apparatus cannot receive the ID from the destination radio communication apparatus. Therefore, the transmission-source radio communication apparatus continues a continuous reception state until the data transmission waiting timer expires. The transmission-source radio communication apparatus discards generated transmission data, which is in a transmission waiting state after the timer expiration, and changes to the sleep state (step S202).

Thereafter, the destination radio communication apparatus resumes transmission of the ID to the transmission-source radio communication apparatus after cancellation of the transmission time limit (step S203). In this way, in the conventional radio communication system, when one radio communication apparatus cannot transmit the ID because of an excess of the transmission time limit, a communication-partner radio communication apparatus continues the continuous reception state until the DATA transmission waiting timer expires. Therefore, wasteful electric power is consumed.

Figure 6:
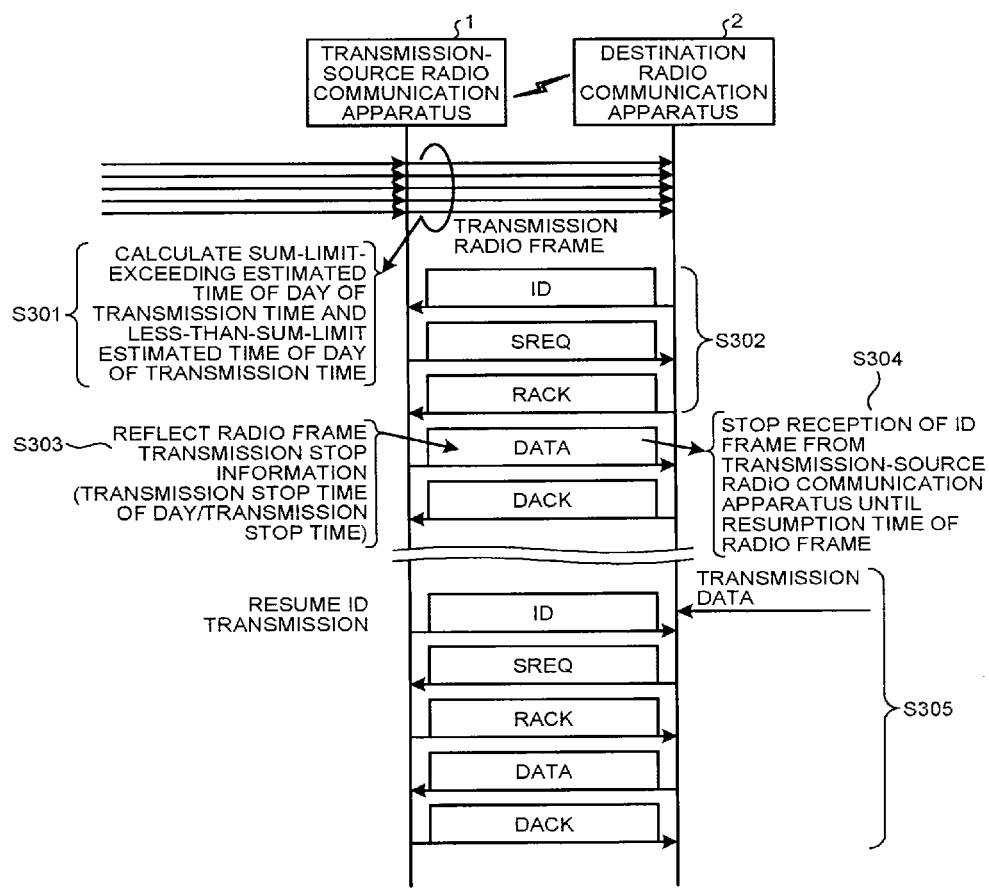
FIG. 6 is a sequence diagram illustrating a state in which a radio frame is intermittently transmitted and received in the radio communication system in the first embodiment.

Next, transmission and reception of a radio frame in the radio communication system in the present embodiment are explained. FIG. 6 is a sequence diagram illustrating a state in which a radio frame is intermittently transmitted and received in the radio communication system in the present embodiment.

In the transmission-source radio communication apparatus 1, while the transmission-source radio communication apparatus 1 is transmitting a transmission radio frame to the destination radio communication apparatus 2, the transmission-limit-time-of-day estimating unit 45 calculates a sum-limit-exceeding estimated time of day of a transmission time and a less-than-sum-limit estimated time of day of a transmission time on the basis of integration results of the transmission-time-sum integrating unit 43 and the transmission-time estimating and integrating unit 44 (step S301).

Transmission and reception of the ID, the SREQ, and the RACK are performed between the transmission-source radio communication apparatus 1 and the destination radio communication apparatus 2 (step S302), thereby falling into a state where the DATA can be transmitted from the transmission-source radio communication apparatus 1 to the destination radio communication apparatus 2.

In the transmission-source radio communication apparatus 1, the transmission-stop-time calculating unit 47 and the transmission control unit 41 can grasp from the calculated time of day (the sum-limit-exceeding estimated time of day of the transmission time) that the transmission time limit is exceeded and a periodical intermittent transmission (transmission of the ID) cannot be performed. Therefore, in the transmission-source radio communication apparatus 1, before the transmission time limit is exceeded (before the sum-limit-exceeding estimated time of day), the transmission control unit 41 transmits the DATA including information concerning a transmission stop time of day and a transmission stop time to the destination radio communication apparatus 2 as radio frame transmission stop information (step S303).

When the destination radio communication apparatus 2 acquires the transmission stop time of day and the transmission stop time of the radio frame from the transmission-source radio communication apparatus 1, the transmission control unit 41 transmits the DACK to the transmission-source radio communication apparatus 1. The reception control unit 42 stops link continuation with the transmission-source radio communication apparatus 1 without waiting for the expiration of the link continuation time timer. The reception control unit 42 stops a continuous reception operation for the ID from the transmission-source radio communication apparatus 1, which is performed in response to transmission of transmission data addressed to the transmission-source radio communication apparatus 1, until a resumption time of day for the radio frame (step S304). The resumption time of day is a time of day after the elapse of the transmission stop time from the transmission stop time of day. Consequently, the destination radio communication apparatus 2 can avoid uselessly continuously waiting for reception of the radio frame from the transmission-source radio communication apparatus 1 and can reduce electric power to be consumed.

In the destination radio communication apparatus 2, the reception control unit 42 resumes the reception operation at the resumption time of day, that is, when the transmission stop time elapses after the reception operation is stopped. When the destination radio communication apparatus 2 acquires transmission data from a not-shown network unit or the like, the destination radio communication apparatus 2 receives the ID from the transmission-source radio communication apparatus 1 that has resumed transmission of the ID to thereby perform transmission and reception of the SREQ, the RACK, the DATA, and the DACK to and from the transmission-source radio communication apparatus 1 (step S305). The transmission direction of radio frames is an opposite direction of a direction in which the transmission-source radio communication apparatus 1 transmits the DATA.

Note that, in FIG. 6, a state in which the radio frame transmission stop information is stored in the DATA is shown. However, this is only an example. If the same effect is exhibited, the radio frame transmission stop information only has to be stored in at least one radio frame of the ID, the SREQ, the RACK, the DATA, and the DACK.

As explained above, in the present embodiment, in the radio communication system including the transmission-source radio communication apparatus 1 and the destination radio communication apparatus 2 that asynchronously transmit and receive radio frames, when the transmission time per unit time is specified in each radio communication apparatus, the transmission-source radio communication apparatus 1 in which a transmission time per unit time is estimated to exceed the specified transmission time notifies in advance the communication-partner destination radio communication apparatus 2 of the transmission stop time of day and the transmission stop time of a radio frame due to the excess of the transmission time. The destination radio communication apparatus 2 that receives the notification stops the standby state for reception and transmission of the radio frame while the communication-partner transmission-source radio communication apparatus 1 cannot transmit the radio frame. Consequently, the destination radio communication apparatus 2 that recognizes in advance that the communication-partner transmission-source radio communication apparatus 1 cannot transmit the radio frame can stop the standby state, avoid a useless active state, and reduce power consumption.

Note that the transmission-source radio communication apparatus 1 calculates the transmission stop time on the basis of the sum-limit-exceeding time of day of the transmission time and the less-than-sum-limit time of day of the transmission time and notifies the destination radio communication apparatus 2 of the transmission stop time of day and the transmission stop time of the radio frame. However, the notification to the destination radio communication apparatus 2 by the transmission-source radio communication apparatus 1 is not limited to this. For example, the transmission-source radio communication apparatus 1 can notify the destination radio communication apparatus 2 of two types of time-of-day information, i.e., the sum-limit-exceeding time of day of the transmission time and the less-than-sum-limit time of day of the transmission time. The destination radio communication apparatus 2 can stop the standby state of reception and transmission of the radio frame during a period specified on the basis of the indicated two types of time-of-day information. In this case, the transmission-source radio communication apparatus 1 and the destination radio communication apparatus 2 can reduce processing for calculating the transmission stop time.

The transmission-source radio communication apparatus 1 notifies the destination radio communication apparatus 2 of two types of information, i.e., the transmission stop time of day (the sum-limit-exceeding time of day of the transmission time) and the transmission stop time. However, the transmission-source radio communication apparatus 1 can also notify the destination radio communication apparatus 2 of one of the two types of information. For example, when the destination radio communication apparatus 2 is notified of only the information concerning the transmission stop time of day, the destination radio communication apparatus 2 can stop the standby state at the transmission stop time of day and return to the standby state after a period of a normal intermittent operation. When the destination radio communication apparatus 2 is notified of only the transmission stop time, the destination radio communication apparatus 2 can immediately stop the standby state and return to the standby state after the elapse of the transmission stop time. In both the cases, the effects to the same degree as those in the operation explained above (reduction of power consumption) cannot be obtained. However, power consumption can be reduced compared with the related art.

Second Embodiment

In the present embodiment, an explanation will be made of a case where transmission radio data and an ID cannot be transmitted from the transmission-source radio communication apparatus 1. Differences from the first embodiment are explained.

Figure 7:
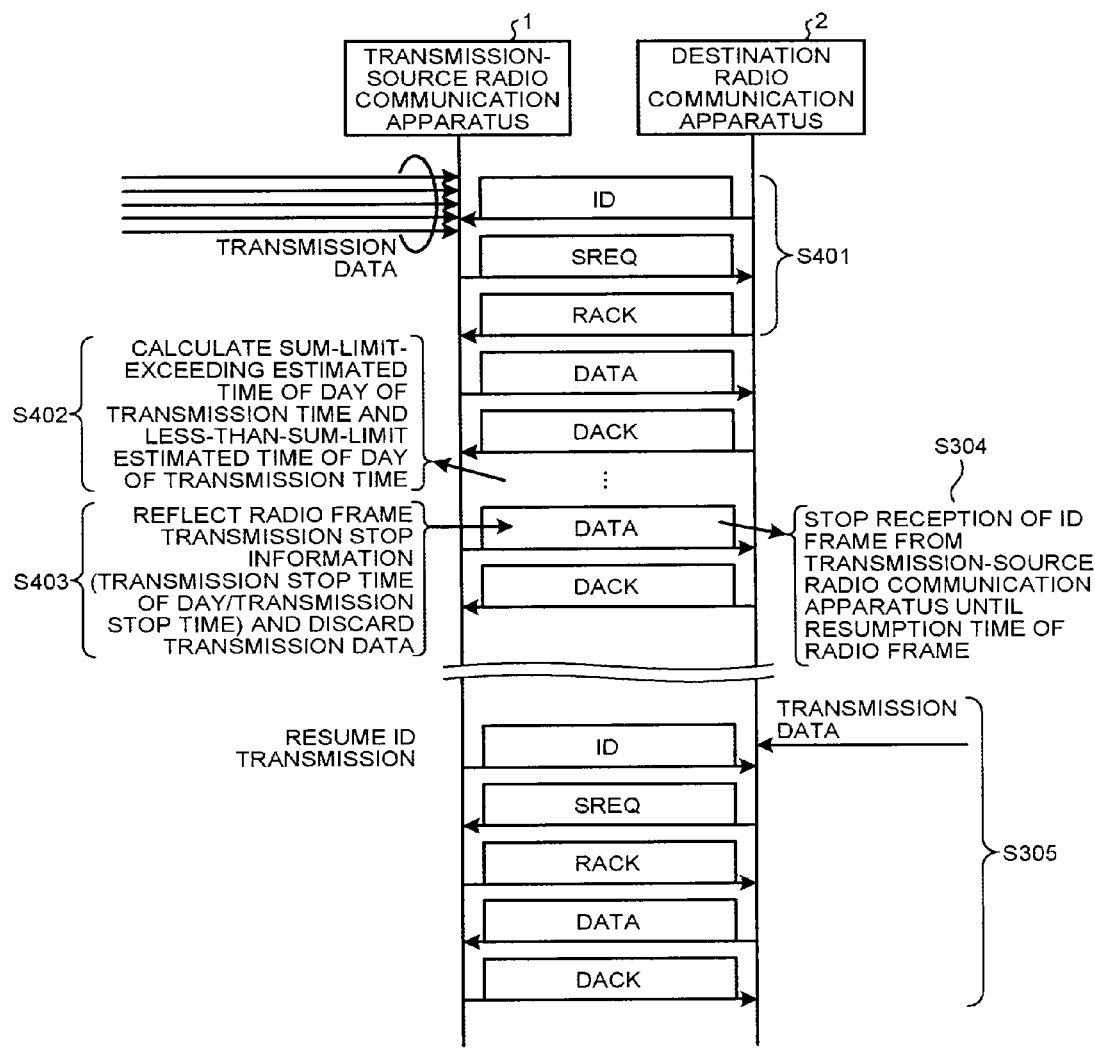
FIG. 7 is a sequence diagram illustrating a state in which a radio frame is intermittently transmitted and received in a radio communication system in a second embodiment.

FIG. 7 is a sequence diagram illustrating a state in which a radio frame is intermittently transmitted and received in a radio communication system in the present embodiment.

The transmission-source radio communication apparatus 1 acquires transmission data from a not-shown network unit or the like. After receiving an ID from the destination radio communication apparatus 2, the transmission-source radio communication apparatus 1 performs transmission and reception of an SREQ and an RACK to and from the destination radio communication apparatus 2 and transmit a DATA to the destination radio communication apparatus 2. The transmission-source radio communication apparatus 1 transmits a DACK to the transmission-source radio communication apparatus 1 in response to the received DATA. The transmission-source radio communication apparatus 1 and the destination radio communication apparatus 2 repeat transmission and reception of the DATA and the DACK (step S401).

In the transmission-source radio communication apparatus 1, while the transmission-source radio communication apparatus 1 is transmitting a transmission radio frame to the destination radio communication apparatus 2, the transmission-limit-time-of-day estimating unit 45 calculates a sum-limit-exceeding estimated time of day of a transmission time and a less-than-sum-limit estimated time of day of a transmission time on the basis of integration results of the transmission-time-sum integrating unit 43 and the transmission-time estimating and integrating unit 44 (step S402).

In the transmission-source radio communication apparatus 1, the transmission-stop-time calculating unit 47 and the transmission control unit 41 can grasp, from the calculated time of day, that the transmission time limit is exceeded and a periodical intermittent transmission (transmission of the ID) cannot be performed and continuous transmission of the transmission data cannot be performed. Therefore, in the transmission-source radio communication apparatus 1, before the transmission time limit is exceeded (before the sum-limit-exceeding estimated time of day), the transmission control unit 41 transmits the DATA including information concerning a transmission stop time of day and a transmission stop time to the destination radio communication apparatus 2 as radio frame transmission stop information. In the transmission-source radio communication apparatus 1, the transmission control unit 41 discards, on the basis of a retained transmission data amount, retained transmission data that cannot be transmitted before the sum-limit-exceeding estimated time of day (step S403). Then, the transmission-source radio communication apparatus 1 immediately stops transmission of the DATA.

When the destination radio communication apparatus 2 acquires the transmission stop time of day and the transmission stop time of the radio frame from the transmission-source radio communication apparatus 1, the transmission control unit 41 transmits the DACK to the transmission-source radio communication apparatus 1. The reception control unit 42 stops link continuation with the transmission-source radio communication apparatus 1 without waiting for expiration of the link continuation time timer. The reception control unit 42 stops a continuous reception operation for the ID from the transmission-source radio communication apparatus 1, which is performed in response to transmission of transmission data addressed to the transmission-source radio communication apparatus 1, until a resumption time of day for the radio frame (step S304). The subsequent operations are the same as the operations in the first embodiment. Consequently, the destination radio communication apparatus 2 can avoid uselessly continuously waiting for reception and can reduce electric power to be consumed. Further, the transmission-source radio communication apparatus 1 can reduce, by immediately stopping transmission of the transmission data, electric power consumed by uselessly transmitting the radio frame.

As explained above, in the present embodiment, when it is estimated that the transmission time per unit time exceeds the specified transmission time in the transmission-source radio communication apparatus 1, the destination radio communication apparatus 2 stops the standby state. The transmission-source radio communication apparatus 1 discards the retained transmission data that cannot be transmitted before the sum-limit-exceeding estimated time of day and immediately stops transmission of the DATA. Consequently, the destination radio communication apparatus 2 can avoid a useless standby state and reduce power consumption. The transmission-source radio communication apparatus 1 can avoid useless radio frame transmission and reduce power consumption.

Third Embodiment

In the present embodiment, an explanation will be made of a case where, after the transmission-source radio communication apparatus 1 transmits transmission radio data, the destination radio communication apparatus 2 transmits transmission radio data. Differences from the first and second embodiments are explained.

FIG. 8 is a sequence diagram illustrating a state in which a radio frame is intermittently transmitted and received in a radio communication system in the present embodiment.

In the transmission-source radio communication apparatus 1, while the transmission-source radio communication apparatus 1 is transmitting a radio transmission frame to the destination radio communication apparatus 2, the transmission-limit-time-of-day estimating unit 45 calculates a sum-limit-exceeding estimated time of day of a transmission time and a less-than-sum-limit estimated time of day of a transmission time on the basis of integration results of the transmission-time-sum integrating unit 43 and the transmission-time estimating and integrating unit 44 (step S301).

In the transmission-source radio communication apparatus 1, the transmission-stop-time calculating unit 47 and the transmission control unit 41 can grasp, from the calculated time of day, that the transmission time limit is exceeded and a periodical intermittent transmission (transmission of an ID) cannot be performed. Therefore, in the transmission-source radio communication apparatus 1, before the transmission time limit is exceeded (before the sum-limit-exceeding estimated time of day), the transmission control unit 41 transmits the ID including information concerning a transmission stop time of day and a transmission stop time to the destination radio communication apparatus 2 as radio frame transmission stop information (step S501).

When the destination radio communication apparatus 2 acquires the transmission stop time of day and the transmission stop time from the transmission-source radio communication apparatus 1, the destination radio communication apparatus 2 determines whether transmission of a DATA from the own apparatus can be completed before the radio frame transmission stop time of day of the transmission-source radio communication apparatus 1. When the destination radio communication apparatus 2 determines that transmission of the DATA can be completed before the transmission stop time of day of the radio frame, in order to continue a transmission and reception operation for the radio frame, which is performed in response to the DATA transmission addressed to the transmission-source radio communication apparatus 1, the destination radio communication apparatus 2 transmits an SREQ (step S502).

After receiving an RACK from the transmission-source radio communication apparatus 1, the destination radio communication apparatus 2 transmits the DATA to the transmission-source radio communication apparatus 1 and receives a DACK to the DATA transmitted from the transmission-source radio communication apparatus 1 (step S503).

At the time of the next ID transmission, the transmission-source radio communication apparatus 1 transmits the ID including information concerning the transmission stop time of day and the transmission stop time updated from the last ID transmission time (step S504).

In a similar manner to step S502, when the destination radio communication apparatus 2 acquires the transmission stop time of day and the transmission stop time of the radio frame from the transmission-source radio communication apparatus 1, the destination radio communication apparatus 2 determines whether transmission of the DATA from the own apparatus can be completed before the radio frame transmission stop time of day of the transmission-source radio communication apparatus 1. When the destination radio communication apparatus 2 determines that transmission of the DATA cannot be completed before the transmission stop time of day of the radio frame, the destination radio communication apparatus 2 stops link continuation with the transmission-source radio communication apparatus 1 without waiting for expiration of the link continuation time timer. The destination radio communication apparatus 2 stops a continuous reception operation for the ID, which is performed in response to the transmission of the transmission data addressed to the transmission-source radio communication apparatus 1, until a resumption time of day for the radio frame (step S505). The subsequent operations are the same as the operations in the first and second embodiments.

As explained above, in the present embodiment, the destination radio communication apparatus 2 determines whether transmission of the DATA can be completed before the transmission stop time of the radio frame. When transmission of the DATA can be completed, the destination radio communication apparatus 2 performs transmission of the DATA to the transmission-source radio communication apparatus 1. When transmission of the DATA cannot be completed, the destination radio communication apparatus 2 stops the reception operation for the radio frame from the transmission-source radio communication apparatus 1. Consequently, in addition to the effect in the first embodiment, in the destination radio communication apparatus 2, it is possible to prevent a situation in which the transmission and reception operation for the radio frame is stopped more than necessary and transmission efficiency of the DATA is deteriorated.

As explained above, the radio communication system according to the present invention is useful for a system that performs transmission and reception of a radio frame and, in particular, suitable when the transmission and reception of the radio frame are intermittently performed.

REFERENCE SIGNS LIST

1 Transmission-source radio communication apparatus
2 Destination radio communication apparatus
10 Antenna
20 Radio transmission and reception unit
30 Baseband unit
31 Transmission-signal processing unit
32 Reception-signal processing unit
40 Access control unit
41 Transmission control unit
42 Reception control unit
43 Transmission-time-sum integrating unit
44 Transmission-time estimating and integrating unit
45 Transmission-limit-time-of-day estimating unit
46 Transmission-source-transmission-limit-time-of-day estimating unit
47 Transmission-stop-time calculating unit

The invention claimed is:

1. A transmission-source radio communication apparatus that transmits data and configures a radio communication system in conjunction with a destination radio communication apparatus that receives the data, the transmission-source radio communication apparatus comprising:
an antenna; and
circuitry coupled to the antennal and configured to:
integrate, from a first time of day to a current time of day, a first transmission time during which a radio frame is transmitted;
integrate, from the current time of day to a second time of day, a second transmission time of a radio frame that is periodically transmitted;
estimate, using the first and second transmission times, at least one of an excess estimated time of day, at which a transmission time of a radio frame exceeds a predetermined time, and a less estimated time of day, at which a transmission time of a radio frame becomes less than the predetermined time after the excess estimated time of day; and
notify, via a transmission through the antenna, the destination radio communication apparatus of at least one of the excess estimated time of day and the less estimated time of day,
wherein the destination radio communication apparatus stops communication with the transmission-source radio communication apparatus, when the destination radio communication apparatus determines that communication with the transmission-source radio communication apparatus is to be stopped based on the at least one of the excess estimated time of day and the less estimated time of day.

2. The transmission-source radio communication apparatus according to claim 1, wherein time from the first time of day to the second time of day is one hour, and the predetermined time is 360 seconds.

3. The transmission-source radio communication apparatus according to claim 1, wherein, when there is retained data that is not capable of being transmitted before the excess estimated time of day, the circuitry discards the retained data.

4. A transmission-source radio communication apparatus that transmits data and configures a radio communication system in conjunction with a destination radio communication apparatus that receives the data, the transmission-source radio communication apparatus comprising:
an antenna; and
circuitry coupled to the antenna and configured to:
integrate, from a first time of day to a current time of day, a first transmission time during which a radio frame is transmitted;
integrate, from the current time of day to a second time of day, a second transmission time of a radio frame that is periodically transmitted;
estimate, using the first and second transmission times, an excess estimated time of day, at which a transmission time of a radio frame exceeds a predetermined time, and a less estimated time of day, at which a transmission time of a radio frame becomes less than the predetermined time after the excess estimated time of day;
calculate, using the excess estimated time of day and the less estimated time of day, a transmission stop time, during which transmission of a radio frame is stopped; and
notify, via a transmission through the antenna, the destination radio communication apparatus of at least one of the excess estimated time of day and the transmission stop time,
wherein the destination radio communication apparatus stops communication with the transmission-source radio communication apparatus, when the destination radio communication apparatus determines that communication with the transmission-source radio communication apparatus is to be stopped based on the at least one of the excess estimated time of day and the transmission stop time.

5. The transmission-source radio communication apparatus according to claim 4, wherein time from the first time of day to the second time of day is one hour, and the predetermined time is 360 seconds.

6. The transmission-source radio communication apparatus according to claim 4, wherein, when there is retained data that is not capable of being transmitted before the excess estimated time of day, the circuitry discards the retained data.

7. A destination radio communication apparatus that receives data and configures a radio communication system in conjunction with a transmission-source radio communication apparatus that transmits the data, the destination radio communication apparatus comprising:

an antenna; and circuitry coupled to the antenna and configured to:

receive, via the antenna and from the transmission-source radio communication apparatus, a notification of at least one of an excess estimated time of day, at which a transmission time of a radio frame exceeds a predetermined time, and a less estimated time of day, at which a transmission time of a radio frame becomes less than the predetermined time after the excess estimated time of day, determine, using the at least one of the excess estimated time of day and the less estimated time of day, whether reception of a radio frame from the transmission-source radio communication apparatus is stopped, and when it is determined that the reception of the radio frame from the transmission-source radio communication apparatus is stopped, the circuitry stops a continuous reception operation from the transmission-source radio communication apparatus; and determine, using the at least one of the excess estimated time of day and the less estimated time of day, whether transmission of a radio frame to the transmission-source radio communication apparatus is stopped, and when it is determined that the transmission of the radio frame to the transmission-source radio communication apparatus is stopped, the circuitry stops a link continuation with the transmission-source radio communication apparatus.

8. A radio communication method for a transmission-source radio communication apparatus that transmits data and configures a radio communication system in conjunction with a destination radio communication apparatus that receives the data, the method comprising:

integrating, from a first time of day to a current time of day, a first transmission time during which a radio frame is transmitted;

integrating, from the current time of day to a second time of day, a second transmission time of a radio frame that is periodically transmitted;

estimating, using the first and second transmission times, at least one of an excess estimated time of day, at which a transmission time of a radio frame exceeds a predetermined time, and a less estimated time of day, at which a transmission time of a radio frame becomes less than the predetermined time after the excess estimated time of day; and notifying, via a transmission through an antenna, the destination radio communication apparatus of at least one of the excess estimated time of day and the less estimated time of day, wherein the destination radio communication apparatus stops communication with the transmission-source radio communication apparatus, when the destination radio communication apparatus determines that communication with the transmission-source radio communication apparatus is to be stopped based on the at least one of the excess estimated time of day and the less estimated time of day.

9. A radio communication system that includes a transmission-source radio communication apparatus that transmits data and a destination radio communication apparatus that receives the data, wherein the transmission-source radio communication apparatus includes:

a first antenna; and a first circuitry configured to:

integrate, from a first time of day to a current time of day, a first transmission time during which a radio frame is transmitted, integrate, from the current time of day to a second time of day, a second transmission time of a radio frame that is periodically transmitted, estimate, using the first and second transmission times, at least one of an excess estimated time of day, at which a transmission time of a radio frame exceeds a predetermined time, and a less estimated time of day, at which a transmission time of a radio frame becomes less than the predetermined time after the excess estimated time of day, and notify, via a transmission through the first antenna, the destination radio communication apparatus of at least one of the excess estimated time of day and the less estimated time of day; and the destination radio communication apparatus receives the data transmitted by the transmission-source radio communication apparatus and configures a radio communication system in conjunction with the transmission-source radio communication apparatus that transmits the received data, the destination radio communication apparatus comprises:

a second antenna; and a second circuitry coupled to the antenna and configured to:

receive, via the second antenna and from the transmission-source radio communication apparatus, a notification of the at least one of the excess estimated time of day and the less estimated time of day, determine, using the at least one of the excess estimated time of day and the less estimated time of day, whether reception of a radio frame from the transmission-source radio communication apparatus is stopped, and when it is determined that the reception of the radio frame from the transmission-source radio communication apparatus is stopped, the second circuitry stops a continuous reception operation from the transmission-source radio communication apparatus, and determine, using the at least one of the excess estimated time of day and the less estimated time of day, whether transmission of a radio frame to the transmission-source radio communication apparatus is stopped, and when it is determined that the transmission of the radio frame to the transmission-source radio communication apparatus is stopped, the second circuitry stops a link continuation with the transmission-source radio communication apparatus.

* * * * *